United States Patent [19]
Gates et al.

[11] Patent Number: 5,660,034
[45] Date of Patent: Aug. 26, 1997

[54] FOLDING ROOT CROP DEFOLIATOR

[75] Inventors: Don Gates, Fargo, N. Dak.; David R. Shuff, Boise, Id.

[73] Assignee: WEC Company, Oregon, Ill.

[21] Appl. No.: 530,458

[22] Filed: Sep. 12, 1995

[51] Int. Cl.$^6$ .......................... A01D 19/02; A01D 50/00
[52] U.S. Cl. .......................... 56/504; 56/121.4; 56/15.2
[58] Field of Search ........................ 56/504, 121.4, 56/121.46, DIG. 19, 15.1, 15.2; 460/113; 172/311, 776

[56] References Cited

U.S. PATENT DOCUMENTS

| | | | |
|---|---|---|---|
| 3,774,693 | 11/1973 | Orhamn | 172/311 |
| 3,792,733 | 2/1974 | Crandall et al. | 171/58 |
| 3,828,860 | 8/1974 | Poland | 172/311 |
| 3,871,161 | 3/1975 | Eisenhardt | 56/121.46 |
| 3,885,632 | 5/1975 | van der Lely | 172/68 |
| 4,049,058 | 9/1977 | Eisenhardt et al. | 171/58 |
| 4,116,279 | 9/1978 | Kilburn | 171/58 |
| 4,116,282 | 9/1978 | Hansen | 172/126 |
| 4,148,174 | 4/1979 | Mathews et al. | 56/504 X |
| 4,191,260 | 3/1980 | Klindworth | 172/311 |
| 4,243,105 | 1/1981 | Vogel et al. | 172/311 |
| 4,308,714 | 1/1982 | Gates | 56/121.43 |
| 4,316,511 | 2/1982 | Anderson | 172/776 |
| 4,328,869 | 5/1982 | Perelli | 172/311 |
| 4,561,505 | 12/1985 | Williamson | 172/776 |
| 4,615,397 | 10/1986 | Hastings | 172/776 |
| 4,867,245 | 9/1989 | Stevens | 172/776 X |
| 5,062,489 | 11/1991 | Adee | 172/311 |
| 5,303,779 | 4/1994 | Friggstad | 172/311 |
| 5,479,764 | 1/1996 | Crummy et al. | 56/121.4 |

OTHER PUBLICATIONS

Woods Alloway Shredder brochure 1994.
Woods Batwing 3180 2120 brochure 1994.
Woods Batwing Rotary Cutters, models B320, B315, B214 brochure Jan. 1993.
Woods Model MD315 Batwing Rotary Cutter brochure Dec. 1992.

*Primary Examiner*—Terry Lee Melius
*Assistant Examiner*—Heather Shackelford
*Attorney, Agent, or Firm*—Foley & Lardner

[57] ABSTRACT

A foldable root crop defoliator wherein the implement has a central frame with lateral wings pivotally attached to the central frame. The front end of the central frame is adjustably attached to a hitch for towing the defoliator. Plant top cutting and shredding devices are mounted to the wing frames and are driven by a power train connected to the power-take-off (PTO) of the towing vehicle. In a use orientation, the two lateral wings are independently adjustable relative to the ground. Also, they have a range of free motion, and are able to "float" independently over the ground that they are immediately above. For a travel or storage orientation, each lateral wing is rotated upward to a vertical position by actuating a lifting device mounted on the central frame. The lifting device includes, for example, a piston and cylinder, and toggle linkage assembly. By being foldable, the defoliator may be reduced to a much smaller width, making it safer to transport and easier to store.

23 Claims, 7 Drawing Sheets

FOLDING ROOT CROP DEFOLIATOR

BACKGROUND OF THE INVENTION

1. Field of the Invention

The present invention relates to a foldable agricultural implement having independently movable sections for defoliating root crops, particularly sugar beets.

2. Description of Related Art

Removing and cutting up the tops of the sugar beet plants, for example, prior to digging and collecting the sugar beet is known. The known defoliating implements are made with a wide, one-piece frame that covers 12 rows of beets. However, the current frames are stiff, and cannot accommodate the unevenness of ground normally occurring in a beet field. The unevenness of ground results in unevenness of cut and what is known as "skip and scuff" of the sugar beet due to removing either too much or too little of the foliage. Skip and scuff is common with the stiff-frame defoliators and reduces both the yield and efficiency of the current defoliating process.

Other problems associated with the stiff-frame, one-piece defoliator include transporting such a wide agricultural implement. Moving the implement from the farmer's shop to the field requires traveling on public roads and may create a safety hazard by taking up a large portion of the road. In addition, many beet fields have narrow borders as well as narrow gates and passageways leading into them. A wide, one-piece defoliator often cannot be maneuvered through the gates and passageways or around the borders of the fields.

Another problem associated with the one-piece defoliator is storing the implement when it is not in use. The wide, one-piece implement requires large amounts of floor space and causes inefficient use of storage space.

SUMMARY Of THE INVENTION

The present invention is a foldable agricultural implement used to defoliate crops, particularly sugar beets. The implement has a central frame with lateral wings pivotally attached to the central frame. The front end of the central frame is adjustably attached to a hitch structure for towing the implement. Beet top cutting and shredding means are mounted to the wing frames and are driven by a power train connected to the power-take-off (PTO) of the towing vehicle. In the use orientation, the two lateral wings are independently adjustable relative to the ground. Also, they are able to "float" independently over the ground that they are immediately above. This is important because fields have an unevenness that must be compensated for when trying to evenly cut foliage off the tops of the roots of the plants.

For the travel or storage orientation, each lateral wing is rotated upward to a vertical position by actuating a lifting means mounted on the central frame. The lifting means includes, for example, a piston and cylinder, and toggle linkage assembly.

The present invention overcomes the problems noted above for the prior art versions by being independently adjustable and foldable. Each wing independently adjusts to accommodate for, and float over, the unevenness of the field. Also, by being foldable the defoliator may be reduced to a much smaller width, making it safer to transport and easier to store.

DESCRIPTION OF THE PREFERRED EMBODIMENT

Figure 1:
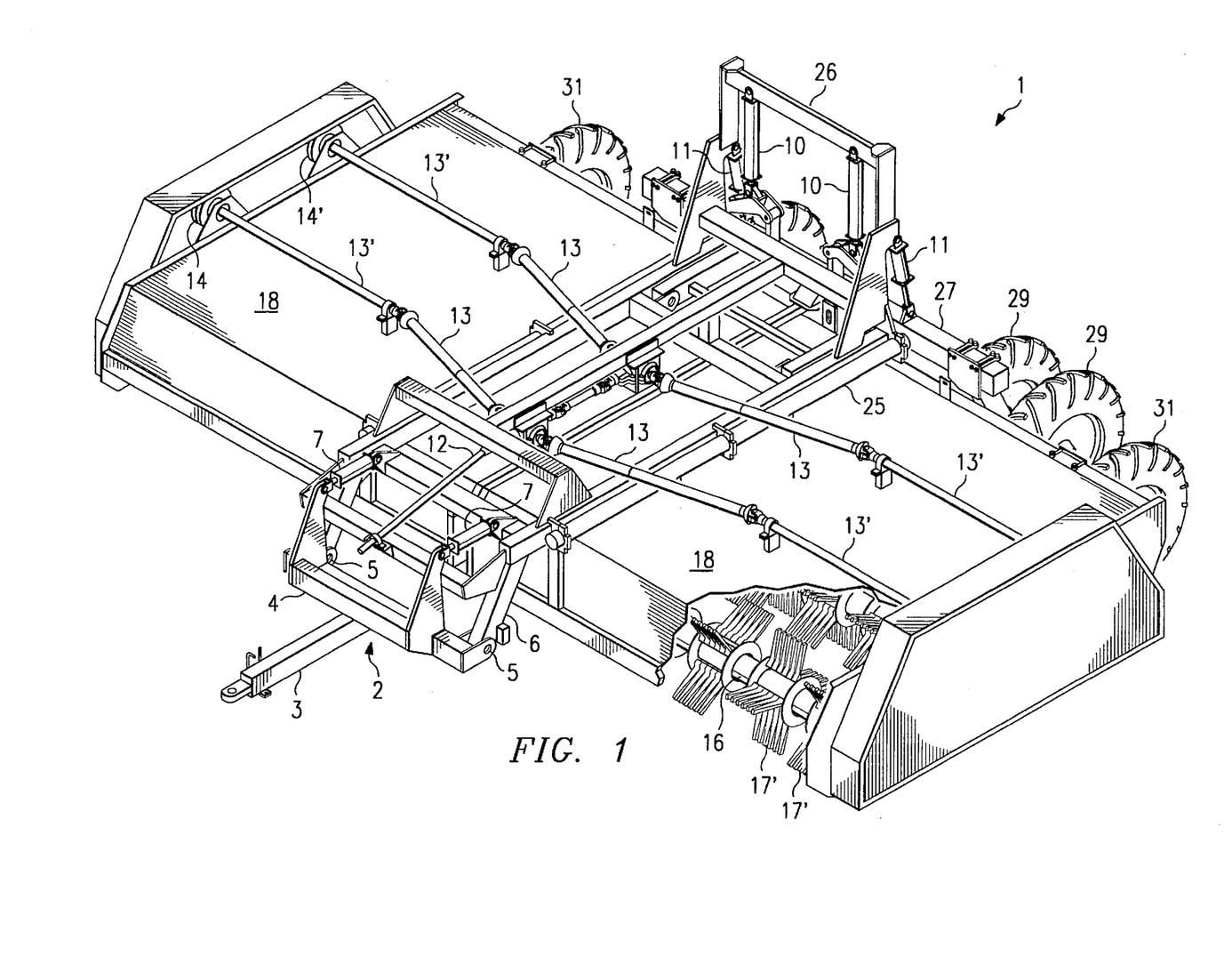
FIG. 1 is a perspective, partially cross-sectional view of one embodiment of the present invention, with the defoliator in a use orientation.

An agricultural implement, broadly designated by numeral 1 in FIG. 1, has an indicated generally at 2. The hitch 2 has a towbar 3 connected to a hitch frame 4 which is adjustably connected at hitch pivot 5 to a defoliator frame 6. A pair of front hydraulic rams 7 raise and lower a front end of defoliator frame 6 relative to towbar 3. Towbar 3 is adapted for connection to a towing vehicle. Defoliator frame 6 supports front hydraulic rams 7, a front gear box 8, a back gear box 9, a pair of top hydraulic rams 10 and a pair of back hydraulic rams 11.

Figure 7:
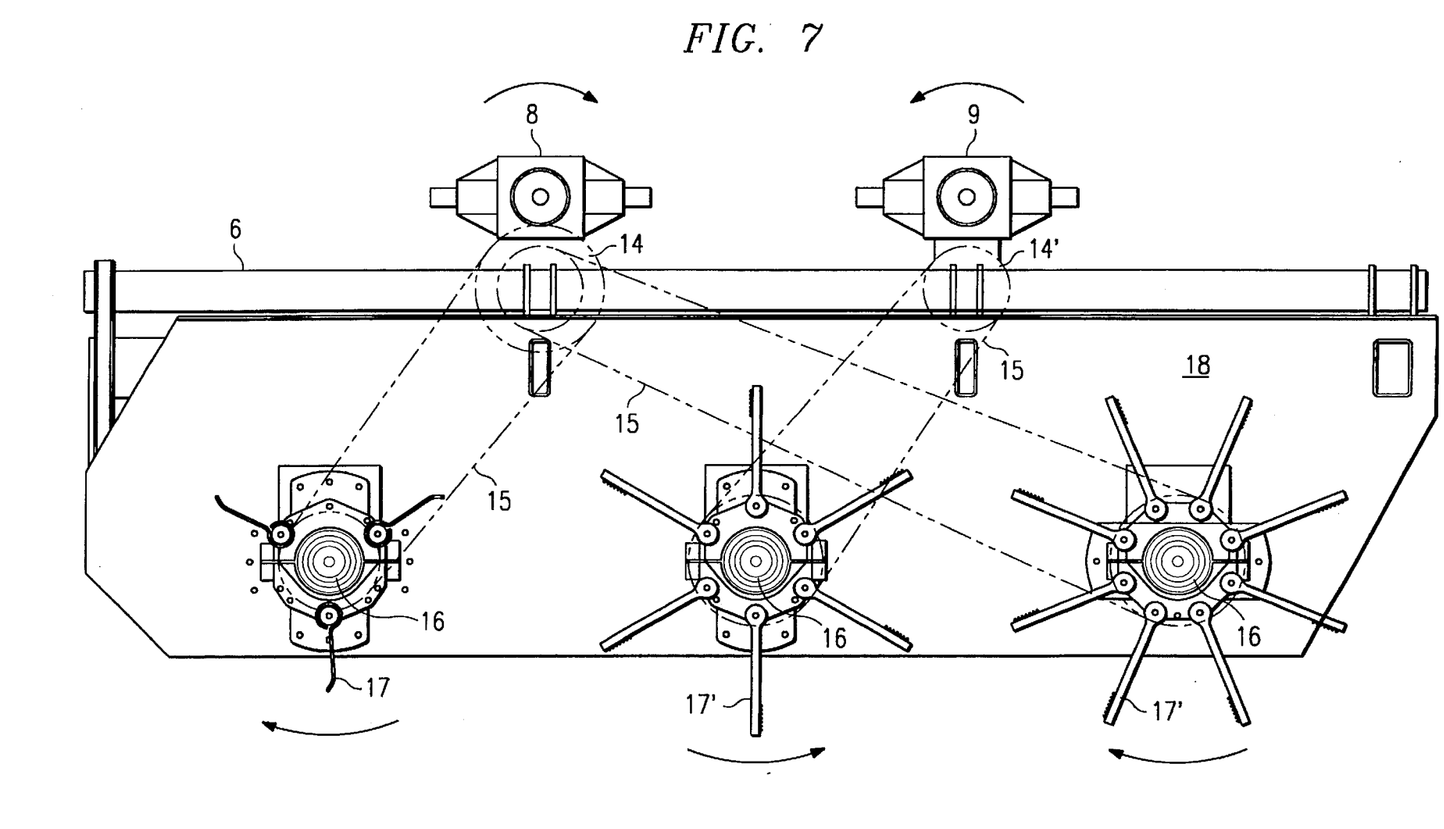
FIG. 7 is a partial schematic side view of the embodiment of FIG. 1, showing an outboard power drive train and a plurality of flails in one set-up.
Figure 8:
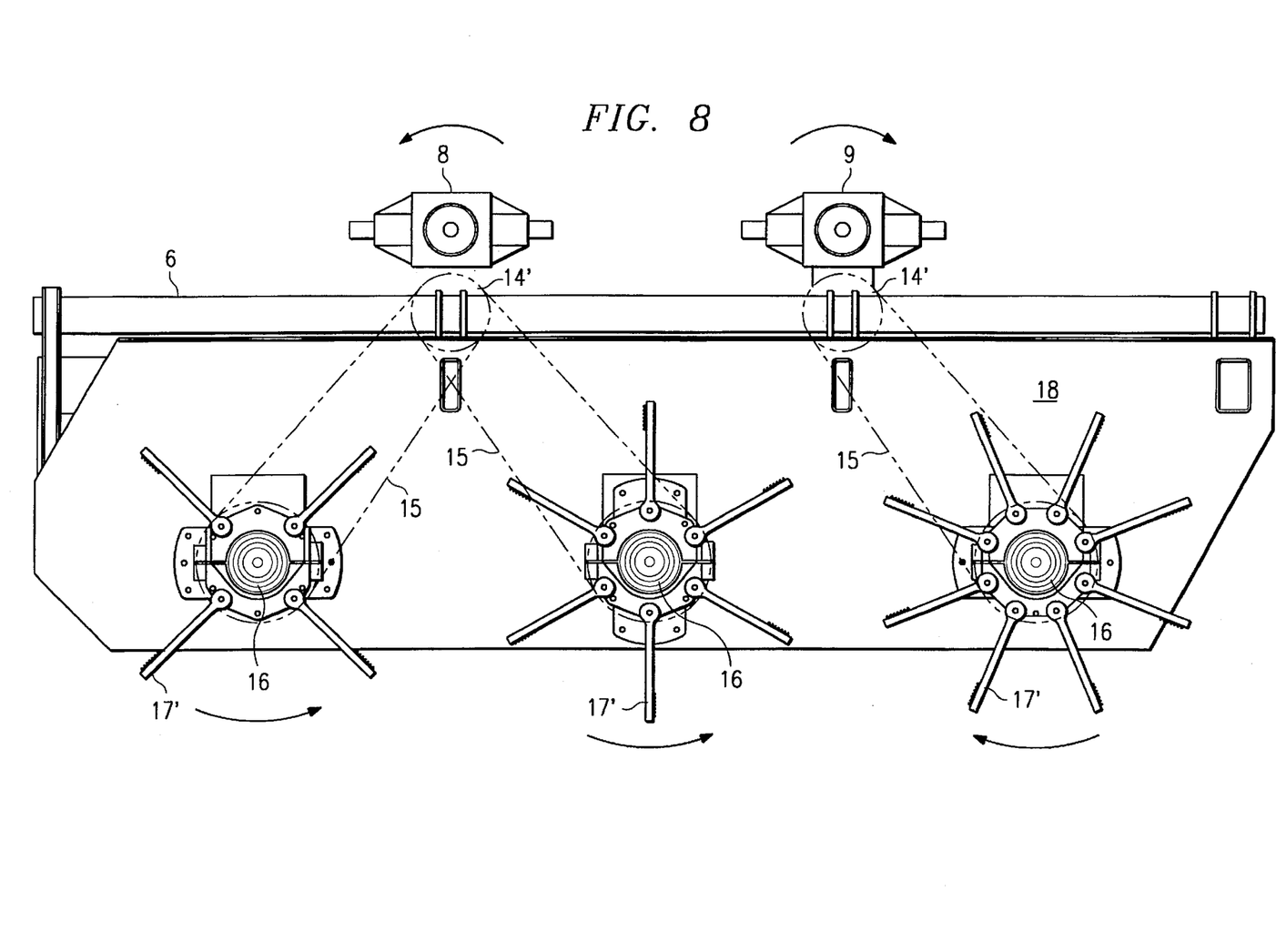
FIG. 8 shows the same view as FIG. 7, but with the outboard power drive train and the flails in an alternative set-up.

Gear boxes 8 and 9 transfer power from PTO main shaft 12 and the towing vehicle to inboard side shafts 13 and outboard side shafts 13'. Outboard side shafts 13', in turn, drive pulleys 14 and 14' and belts 15 which drive, in turn, flail shafts 16, for rotating the cutting and shredding flails 17 and 17'. Flails 17 may be metal, and flails 17' may be rubber or some other polymeric material. Shafts 13, 13' and 16 may be of conventional construction. Side shafts 13 and 13' and flail shafts 16 may rotate in the same, or in opposite directions, as is conventional in the industry. Inboard side shafts 13 must be capable of staying connected to outboard side shafts 13' when the lateral wings 18 are rotated to lift them from the horizontal use orientation into the vertical travel and storage orientation. This connection may be made with conventional flexible couplings.

Wings 18 are generally rectangular canisters with closed tops, open bottoms, and containing shaft 16 and flails 17 and 17' inside. The wings tops may be made of rubber or some other polymeric material.

Figure 2:
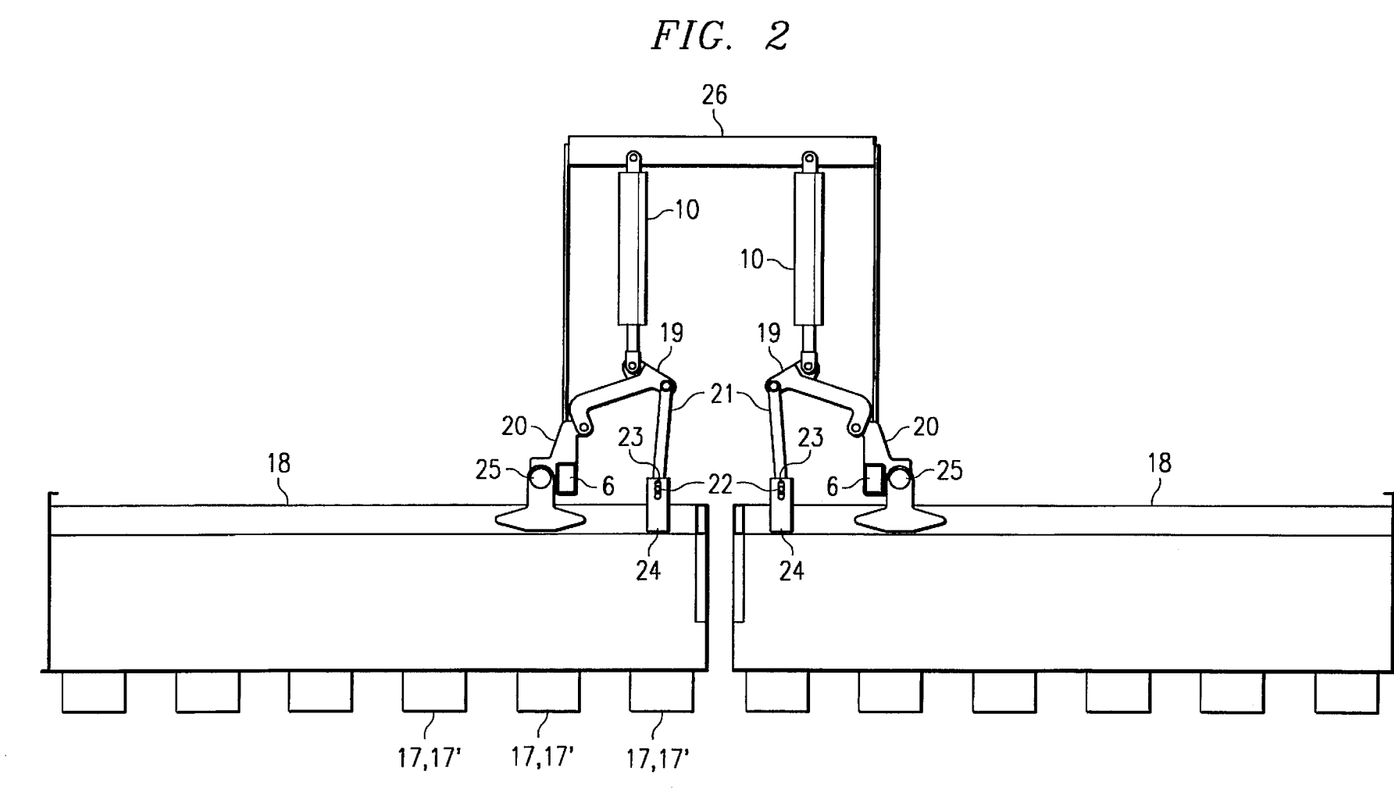
FIG. 2 is a partial schematic rear view of the embodiment of FIG. 1, showing wings of the deflector in the use orientation.
Figure 3:
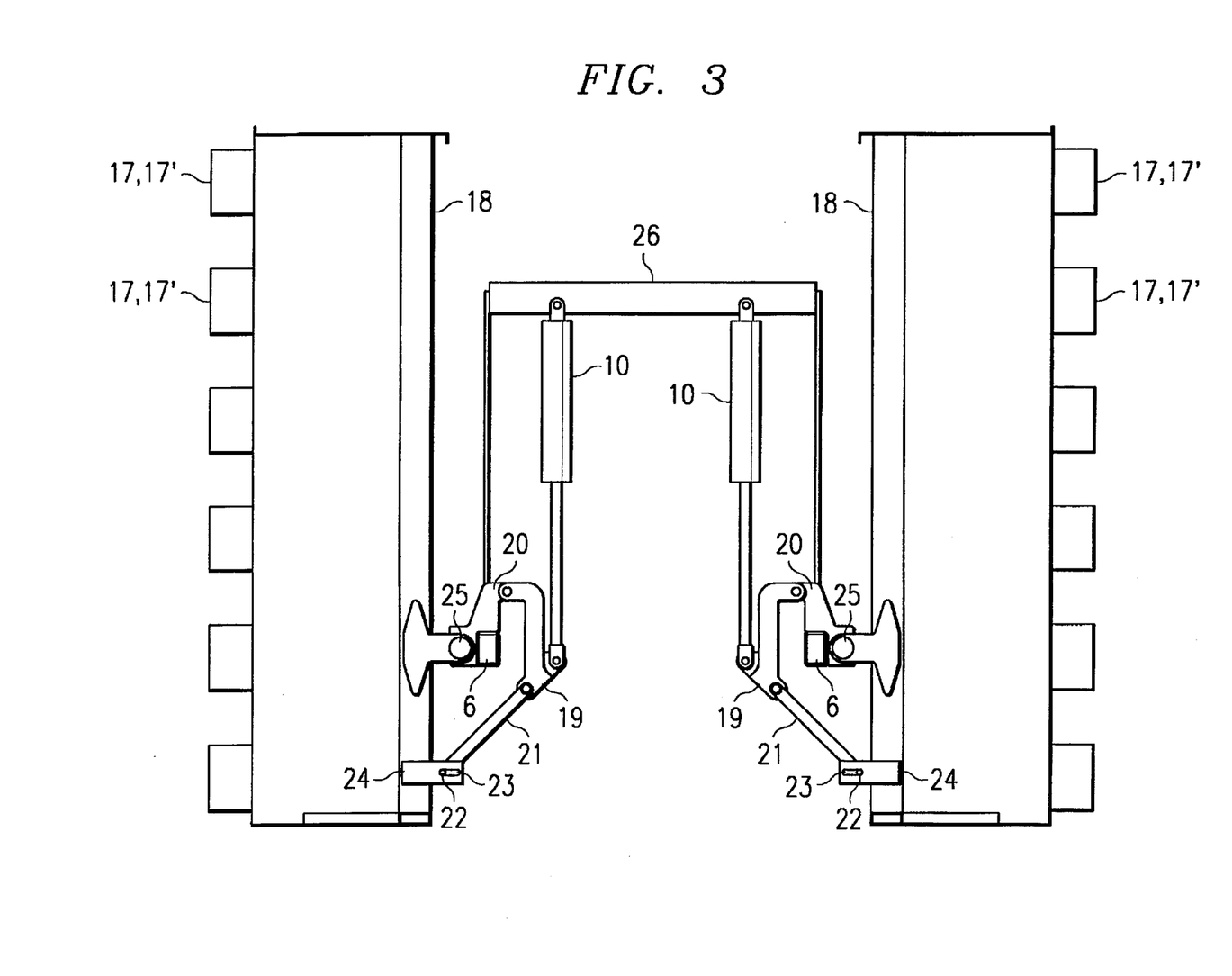
FIG. 3 shows the same view as in FIG. 2, but with the wings in a transport and storage orientation.

Each top hydraulic ram 10 pushes or pulls a respective toggle arm 19 which is pivotally connected to defoliator frame 6 at a respective pivot plate 20. Toggle arm 19, in turn, pushes or pulls, respectively, on link arm 21. Link arm 21 has link arm pin 22 which travels in a slot 23 of link arm lug 24 which is connected to the wings 18. An extension of top rams 10 rotates toggle arm 19 downward, and lifts wings 18 which rotate about respective wing pivots 25, which are also connected to defoliator frame 6 at respective pivot plates 20. A retraction of top rams 10 lowers wings 18.

Top rams 10 are connected to defoliator frame 6 by a top ram support frame 26. The slot 23 of link arm lug 24 allows a free range of motion for a respective wing 18 to pivot freely at wing pivot 25 in the use orientation, resulting in a "float" of wing 18 over the ground. By "a free range of motion", we mean a sufficient distance near the inboard edge of wings 18 to permit wings 18 to rotate at the outboard edge in a direction perpendicular to the direction of travel of the defoliator enough to accommodate ordinary undulations in the ground.

Figure 4:
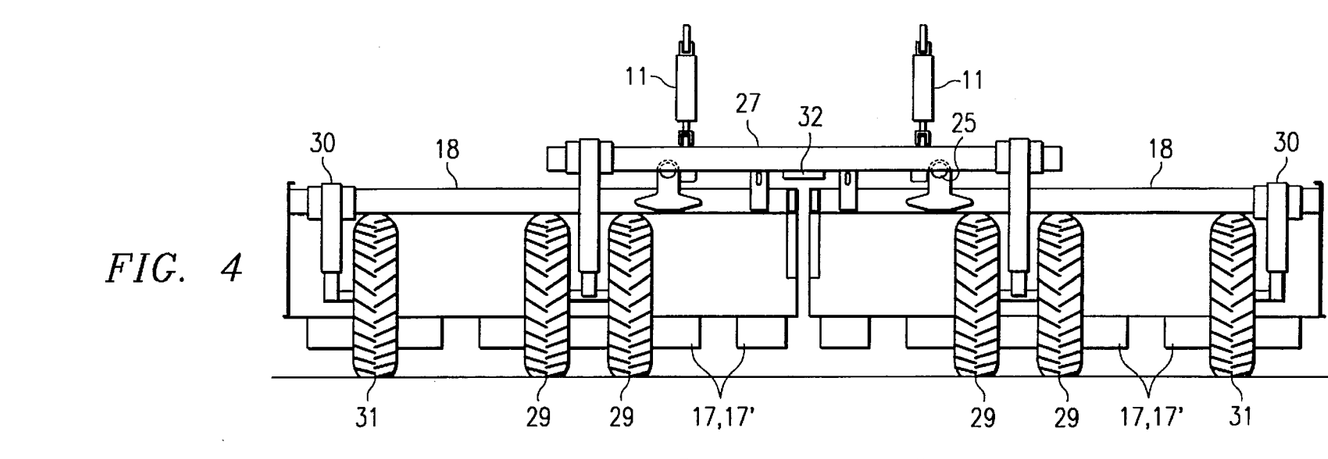
FIG. 4 is a partial, schematic rear view of the embodiment of FIG. 1, showing back hydraulic rams, frame wheels and the wing wheels in the use orientation.
Figure 5:
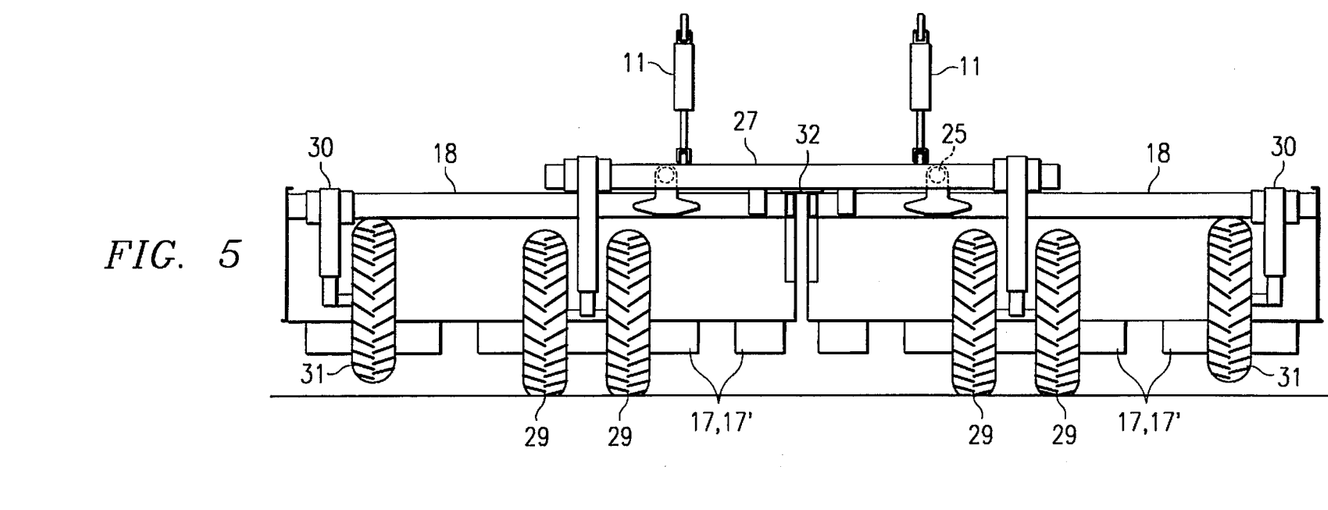
FIG. 5 shows the same view as in FIG. 4, but with the wing wheels in a non-use orientation.
Figure 6:
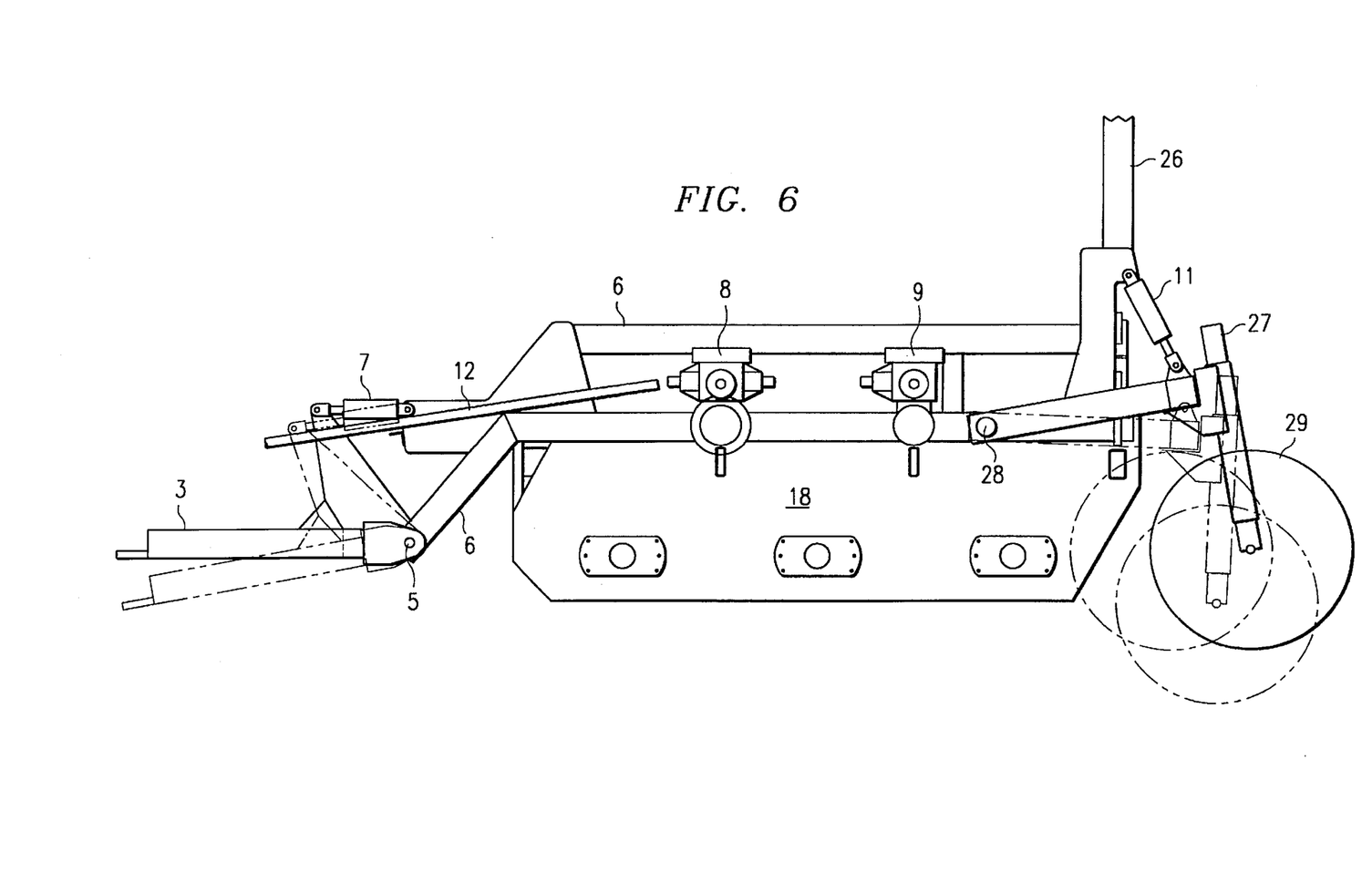
FIG. 6 is a schematic side view of the embodiment of FIG. 1, showing adjustable frame wheels and an adjustable hitch.

With reference to FIGS. 4–6 back hydraulic rams 11 push or pull on rear wheel strut frame 27, which pivots relative to defoliator frame 6 about strut pivot 28. This way, because strut frame 27 is connected to frame wheels 29, back hydraulic rams 11 raise and lower the back end of defoliator frame 6 relative to frame wheels 29.

On the outboard side of each wing 18 is an outboard wheel strut 30, and wing wheel 31. Outboard wheel strut 30 is adjustable, with a hydraulic ram (not shown), for example, relative to the ground, to adjust the height of the outboard part of wings 18, relative to defoliator frame 6. This way, when defoliator frame 6 has been leveled in the direction of travel by adjusting hitch 2 and rear wheels 29, wings 18 may be leveled transverse to the direction of travel by adjusting wing wheels 31. Also, because wings 18 may rotate freely about wing pivots 25 in the use orientation, wings 18 "float" with wing wheels 31 over uneven ground.

Often, when maneuvering the beet defoliator in the field, for example, it is preferred to lift it briefly from the ground. To do this, back hydraulic rams 11 are extended to downwardly displace strut frame 27 and to thereby raise defoliator frame 6 and wings 18 relative to the ground, until the inboard edges of wings 18 contact pad plate 32 of strut frame 27. Also, outboard wheel struts 30 are lifted until wing wheels 31 are clear of the ground. In this way, wings 18 are secured against pivoting about wing pivot 25, and they are held in a horizontal position, while the defoliator is turned around at the end of a row, for example.

In use, towbar 3 is connected to the hitch of a towing vehicle, and main shaft 12 is connected to the PTO of the towing vehicle. Hitch 2 is adjusted to set the level of the front of the defoliator near the ground. Rear wheel strut frame 27 is adjusted by back hydraulic rams 11 to level defoliator frame 6 relative to the ground. Also, outboard wheel struts 30 are adjusted to level both wings 18 relative to the ground. Then, the power train is engaged and the defoliator is towed through the field. When it is desired to transport the defoliator out of the field or to store it, lateral wings 18 are rotated upwards by top hydraulic rams 10, toggle arms 19 and link arms 21.

Although this invention has been described above with reference to particular means, materials and embodiments, it is to be understood that the invention is not limited to these disclosed particulars, but extends instead to all equivalents within the scope of the following claims.

What is claimed is:

1. A foldable defoliator comprising:
   a hitch adapted for connection with a towing vehicle for movement in a direction of travel;
   a central frame member having a front end and a rear end, said front end being pivotally attached to said hitch, said rear end of said central frame member being supported at opposite sides by a plurality of ground-engaging wheels;
   a plurality of wing members, each of said wing members having an inboard end and an outboard end, each of said inboard ends being pivotally connected to said central frame member, each of said wing members extending outwardly from said central frame, each of said outboard ends of said wing members being supported by at least one ground-engaging wheel at said outboard end;
   a support frame, a bottom member of said support frame being mounted on said central frame member, a top end of said support frame opposed to said bottom member of said support frame and displaced upwardly from said central frame member;
   a piston and cylinder assembly including a toggle linkage and a pair of pistons and cylinders, each of said pistons and cylinders having a first and second end, each of said pistons and cylinders being mounted to said top end of said support frame so that the pistons and cylinders may extend in a downward direction;
   said piston and cylinder assembly operable to rotate at least one of said wing members in a direction perpendicular to said direction of travel to a vertical, upwardly extending transport or storage position;
   means for actuating said piston and cylinder assembly;
   means, mounted below each said wing member, for cutting and shredding foliage; and
   means for driving said means for cutting and shredding.

2. The foldable defoliator of claim 1, wherein said toggle linkage is elongated and further comprises a first and, a second end remote from said first end and a top end disposed intermediate said first end and said second end, said first end of said toggle linkage being pivotally mounted to said inboard end of one of said wing members, said second end of said toggle linkage being pivotally mounted to said central frame member, and said top end of said toggle linkage being pivotally connected to said second end of one of said pistons and cylinders.

3. The foldable defoliator of claim 1, wherein said means for driving further comprises a central PTO, means for translating drive power to a plurality of pulleys at said outboard ends of said wing members, a plurality of belts engaging said pulleys, and a plurality of independently-driven flail shafts driven by said belts.

4. The foldable defoliator of claim 3, wherein said means for driving further comprises:
   at least two gear boxes disposed on said central frame member;
   two pairs of inboard shafts, each pair of inboard shafts extending horizontally outward from opposite sides of each of said gear boxes, and
   two pairs of outboard shafts extending laterally above said wing members, said outboard shafts having first and second ends, said first ends of said outboard shafts being connected to an inboard shaft linkage, said second ends of said outboard shafts being drive ends and each having at least one pulley, each of said pulleys extending laterally outboard of a respective wing member.

5. The foldable defoliator claim 4, wherein said means for cutting and shredding comprises a plurality of flail assemblies mounted on each of said independently-driven flail shafts.

6. A ground-treating implement operable to be moved over the ground, comprising:
   a frame;
   at least one wing including an inboard edge and an outboard edge remote from said inboard edge, a pivot articulably and operatively connecting said wing to said frame and disposed intermediate said inboard edge and said outboard edge, said wing rotatable around said pivot between an in-use position in which said wing is disposed near the ground and a transport or storage position in which said outboard edge of said wing is disposed remotely from the ground; and a wing lifter operatively connected to said frame and operatively connected to a point on said wing inboard of said pivot, said wing lifter operable to push down on said wing inboard of said pivot to rotatably raise said outboard edge to said transport or storage position, said wing lifter operable to pull up said wing at a position inboard of said pivot to lower said outboard edge of said wing from said transport or storage position to said in-use position.

7. The implement of claim 6, wherein said implement is a defoliator.

8. The implement of claim 6 and further including a second wing having an inboard edge and an outboard edge remote from the last said inboard edge, a second pivot articulably and operatively connecting said wing to said frame and disposed on said second wing to be intermediate said inboard edge of said second wing and said outboard edge of said second wing, said second wing rotatable around said second pivot between an in-use position in which said second wing is disposed near the ground and a transport or storage position in which said outboard edge of said second wing is disposed remotely from the ground;

a second wing lifter operatively connected to said frame and operatively connected to a point on said second wing inboard or said second pivot, said second wing lifter operable to push down on said second wing inboard of said second pivot to rotatably raise said outboard edge of said second wing to said transport or storage position, said second wing lifter operable to pull up said second wing at a position inboard of said second pivot to rotatably lower said outboard edge of said second wing from said transport or storage position to said in-use position.

9. The implement of claim 8, wherein said first and second pivots are elongated hinges disposed in parallel to each other.

10. The implement of claim 6, wherein said frame includes a top frame element having a top end disposed above said pivot, said wing lifter including a ram operatively connected between said top end of said top frame element and said point on said wing inboard of said pivot.

11. The implement of claim 10, wherein said ram is hydraulically actuated.

12. The implement of claim 10, wherein said ram has a lower end, an upper end of said ram operatively connected to said top end of said top frame element, a toggle arm operatively connecting said lower end of said ram to said pivot and to said point on said wing inboard of said pivot.

13. The implement of claim 12, wherein said wing lifter further includes a link arm, a first end of said link arm operatively connected to said toggle arm, a second end of said link arm remote from said first end of said link arm and operatively connected to said point on said wing inboard of said pivot.

14. The implement of claim 6, wherein said implement is operable to move in a direction of travel, a plane of rotation of said wing being substantially perpendicular to said direction of travel.

15. The implement of claim 14, wherein said implement is moved by being towed by a towing vehicle.

16. The implement of claim 6 wherein said implement is operable to be towed by a towing vehicle.

17. A ground-treating implement operable to be moved over the ground on an axis of travel, said implement comprising:

a strut frame;

at least one implement frame extending in a direction at an angle to the direction of travel and having at least one outboard end, at least one outboard wheel mounted to said implement frame for supporting said outboard end of said implement frame above the ground, a pivot operatively and articulably connecting said implement frame to said strut frame;

at least one strut wheel operatively connected to said strut frame for supporting said strut frame above the ground, said strut wheel disposed inboard from said outboard wheel and having an axis displaced from said pivot in a direction parallel to the axis of travel; and an implement frame lifter operatively connected to said implement frame at a point displaced in a direction parallel to the axis of travel from said pivot and operatively connected to said strut frame, said frame lifter operable to displace said strut frame downwardly around said pivot with respect to said implement frame to thereby lift said implement frame relative to the ground, such that said outboard wheel no longer engages the ground, said implement frame lifter operable to displace said strut frame upwardly around said pivot to thereby lower said implement frame relative to the ground, thereby causing said outboard wheel to engage the ground.

18. The implement of claim 17, and further comprising:

a second implement frame member extending in a direction at an angle to the direction of travel and having an outboard end, at least one outboard wheel mounted to said second implement frame member for supporting said outboard end of said second implement frame member above the ground, a second pivot operatively and articulably connecting said second implement frame member to said strut frame;

said implement frame lifter operatively connected to said second implement frame member at a point displaced from said second pivot, said frame lifter operable to rotate said strut frame downwardly around said second pivot with respect to said second implement frame member to thereby lift said second implement frame member relative to the ground, such that said outboard wheel of said second implement frame member no longer engages the ground, said implement frame lifter operable to rotate said strut frame upwardly around said second pivot to thereby lower said second implement frame member relative to the ground, thereby causing said outboard wheel of said second implement frame to engage the ground.

19. The implement of claim 17, wherein said implement frame has an upper inboard corner, said strut frame having a downward facing contact plate, said inboard corner of said implement frame abutting said contact plate and limiting further upward movement of said implement frame when said implement frame is lifted relative to said strut frame by said implement frame lifter.

20. The implement of claim 17, wherein said implement frame includes a central frame member and at least one wing having an inboard edge and an outboard edge opposed to said inboard edge, a wing lifter pivot mounted on said wing intermediate said inboard edge and said outboard edge of said wing, said wing lifter pivot articulably and operatively connecting said wing to said central frame member, said wing rotatable around said wing lifter pivot between an in-use position in which said wing is disposed near the ground and a transport or storage position in which said outboard edge of said wing is disposed remotely from the ground; and a wing lifter operatively connected to said central frame member and operatively connected to a point on said wing inboard of said pivot, said wing lifter operable to rotate said wing around said wing lifter pivot between said in-use position and said storage or transport position.

21. The implement of claim 17, wherein said at least one strut wheel has an axis which is disposed rearwardly of said pivot.

22. The implement of claim 17, wherein said implement is a defoliator.

23. The implement of claim 17, and further including a plurality of strut wheels supporting said strut frame off of the ground.

* * * * *